United States Patent
Suzuki et al.

(10) Patent No.: US 10,442,968 B2
(45) Date of Patent: Oct. 15, 2019

(54) LATENT HEAT TRANSFER MATERIAL MICRO-ENCAPSULATED IN HARD SHELL, AND PRODUCTION METHOD FOR SAME

(71) Applicant: NATIONAL UNIVERSITY CORPORATION KOBE UNIVERSITY, Kobe-shi, Hyogo (JP)

(72) Inventors: Hiroshi Suzuki, Hyogo (JP); Yoshiyuki Komoda, Hyogo (JP); Ruri Hidema, Hyogo (JP)

(73) Assignee: National University Corporation Kobe University, Hyogo (JP)

( * ) Notice: Subject to any disclaimer, the term of this patent is extended or adjusted under 35 U.S.C. 154(b) by 586 days.

(21) Appl. No.: 14/913,568

(22) PCT Filed: Aug. 25, 2014

(86) PCT No.: PCT/JP2014/004369
§ 371 (c)(1),
(2) Date: Feb. 22, 2016

(87) PCT Pub. No.: WO2015/025529
PCT Pub. Date: Feb. 26, 2015

(65) Prior Publication Data
US 2016/0251557 A1  Sep. 1, 2016

(30) Foreign Application Priority Data

Aug. 23, 2013 (JP) .................................. 2013-173997

(51) Int. Cl.
*C09K 5/00* (2006.01)
*C09K 5/06* (2006.01)
(Continued)

(52) U.S. Cl.
CPC ............... *C09K 5/063* (2013.01); *B01J 2/08* (2013.01); *B01J 13/14* (2013.01); *B01J 13/203* (2013.01);
(Continued)

(58) Field of Classification Search
None
See application file for complete search history.

(56) References Cited

U.S. PATENT DOCUMENTS 4,660,625 A * 4/1987 Musinski ............ F28D 15/0233
165/104.14
6,099,894 A  8/2000 Holman
(Continued)

FOREIGN PATENT DOCUMENTS

JP  51-086075 B  7/1976
JP  53-022530 A  3/1978
(Continued)

OTHER PUBLICATIONS

Translation of ISR, PCT/JP2014/004369, 2 pages, dated Dec. 9, 2014.
(Continued)

*Primary Examiner* — Necholus Ogden, Jr.
(74) *Attorney, Agent, or Firm* — Ogilvie Law Firm

(57) ABSTRACT

Provided is a latent heat transfer material that is micro-encapsulated, said material exhibiting superior mechanical strength and heat resistance. A production method for the latent heat transfer material that is micro-encapsulated in a hard shell comprises: 1) a step in which a perforate hollow silica particle is manufactured; 2) a step in which the phase change material is sealed inside the perforate hollow silica particle by inserting the perforate hollow silica particle in a molten solution of the phase change material and repeatedly subjecting the same to vibrations such as ultrasound oscil-
(Continued)

lations; 3) a step in which the perforate hollow silica particle having the phase change material sealed within is washed in a saturated aqueous solution of the phase change material; and 4) a step in which perhydropolysilazane is used to coat the outer shell of the perforate hollow silica particle with silica.

6 Claims, 5 Drawing Sheets

(51) Int. Cl.
    *B01J 13/22*     (2006.01)
    *B01J 13/14*     (2006.01)
    *F28D 20/02*     (2006.01)
    *C01B 33/12*     (2006.01)
    *B01J 2/08*     (2006.01)
    *B01J 13/20*     (2006.01)

(52) U.S. Cl.
    CPC ............... *B01J 13/22* (2013.01); *C01B 33/12* (2013.01); *F28D 20/023* (2013.01); *Y02E 60/145* (2013.01); *Y02E 70/30* (2013.01)

(56) References Cited

U.S. PATENT DOCUMENTS

| | | |
|---|---|---|
| 2009/0229593 A1 | 9/2009 | Komiya |
| 2009/0278074 A1 | 11/2009 | Cox et al. |
| 2014/0031463 A1* | 1/2014 | Kempter ................ C09K 21/12<br>524/127 |
| 2015/0182468 A1* | 7/2015 | Liu ........................ A01N 25/28<br>424/497 |
| 2016/0177156 A1 | 6/2016 | Skrzypski et al. |

FOREIGN PATENT DOCUMENTS

| | | |
|---|---|---|
| JP | 1979-6251 B | 3/1979 |
| JP | 61-227913 A | 10/1986 |
| JP | 63-258642 A | 10/1988 |
| JP | 63-270306 A | 11/1988 |
| JP | 2000-130975 A | 5/2000 |
| JP | 2007-137916 A | 6/2007 |
| JP | 2007-230794 A | 9/2007 |
| JP | 2007-239697 A | 9/2007 |
| JP | 2008-285356 A | 11/2008 |
| JP | 2013-10915 A | 1/2013 |
| JP | 2013-133250 A | 7/2013 |
| WO | 20120121130 | 9/2012 |

OTHER PUBLICATIONS

Zhang, et al., "Silica encapsulation of n-octadecane via sol-gel process . . . ", DOI: 10.1016/j.jcis.2009.11.036, Mar. 2010, 12 pages.

* cited by examiner

LATENT HEAT TRANSFER MATERIAL MICRO-ENCAPSULATED IN HARD SHELL, AND PRODUCTION METHOD FOR SAME

TECHNICAL FIELD

The present invention relates to a latent heat transportation material enclosed in microcapsules and a manufacturing method thereof, the heat transportation material being a phase change material for providing absorption and release of latent heat in response to temperature changes.

BACKGROUND ART

Conventionally, it is known that efficient heat transportation becomes possible by using latent heat materials.

Also, a heat transportation device for transporting heat by a heat transport medium in a heat transportation circulatory system connected to a heat source by using a fluid containing latent heat materials as a heat transport medium (patent literature 1), and a high temperature region cooling device using a slurry of latent heat material suspension (patent literature 2) is known.

In the heat transportation device mentioned above (patent literature 1), as a fluid that includes a latent heat material (a latent heat storage material) to be used as a heat transport medium, a fluid wherein a fine solid particle of a latent heat material that changes its phase from solid to liquid by melting at a desired temperature (a phase change temperature) being dispersed in a vehicle such as water is used. As a latent heat material, octacosane (C28H58 a melting point 61.5° C.). and so on are used when the desired temperature is set at 60° C., for example. Also, it is disclosed that a surfactant such as polyethylene glycol and stearyl ether for adding hydrophilicity with water and a dispersant such as sodium alkyl benzene sulfonate for improving dispersion stability of fine latent heat materials are added to a latent heat material to make a heat transport medium using emulsion made by dispersion of these agents in water. Furthermore, it is shown that the microencapsulated latent heat material can also be used as a heat transport medium and material systems wherein shells made of rubbers, plastics, metals and so on are filled with latent heat materials such as magnesium chloride, sodium chloride, paraffin, naphthalene and so on are exemplified as such. (Refer to paragraph 0009 in patent literature 1)

Also, in the high temperature region cooling device mentioned above (patent literature 2), it is described that the phase transition temperature whereat a high temperature heat source and a low temperature heat source exchange heat by utilizing a latent heat material being in a higher temperature region in the form of suspension and slurry in a heating medium, the scope of applicability can be extended to objects in a higher temperature region, to employ paraffin, hydrates and microencapsulation thereof all being suspended in the heat medium, and the latent heat materials are to be selected corresponding to their phase transition temperatures. Also, it is shown that the latent heat materials need to exist in a solid state when the heat medium absorbs heat from high temperature heat source for utilizing the phase transition of the latent heat materials, and that the solid state latent heat materials included in the heat medium are preferably made into particles to be easily suspended in solvents so that the transportation thereof can be easy. (Refer to paragraphs 0007 and 0010 in patent literature 2)

On the other hand, micro spherical containers of particle sizes from several μm to several hundred μm with outer shell of about 1 μm thickness capable of liquid or solid inclusion are called micro capsules. Especially, hollow silica microcapsule is an excellent material hardly affecting organisms and environment in negative way.

As a manufacturing method of hollow silica microcapsules, for example, a method to have silica precipitate on oil drops and organic polymer particles that form emulsion or particulates in water, to manufacture materials in core and shell structures and then to have the oil drops and polymers be removed by calcination or solvent extraction making the particulates hollow, is known. Specifically, it is known that the manufacturing method of hollow silica micro capsules consists of the following three processes, namely, the first process wherein a W/O type emulsion is obtained by mixing an organic solvent and a surfactant into an aqueous solution containing at least one kind of alkali metal silicate, the second process wherein hollow silica micro capsules are formed by mixing an aqueous solution of a compound being at least one kind selected from a group consisting of inorganic acids, organic acids, ammonium salts of inorganic acids, ammonium salts of organic acids and carbonates of alkali metals, and also capable of forming a water insoluble sediment by reaction with alkali metal silicate in aqueous solution with emulsion obtained in the first process, and the third process wherein the hollow silica micro capsules thus formed are washed in turn with alcohol and water, and then dried. (Refer to patent literatures 3~9, for example)

The surface of the hollow silica microcapsules obtained by the manufacturing method mentioned above possesses micro pores and the hollow silica microcapsules are widely used in fields such as cosmetics, medicines, agricultural chemicals, catalysts, fibers, printings, films and so on.

PRIOR ART

Patent Literature

[Patent literature 1] JP 2000-130975 A
[Patent literature 2] JP 2007-239697 A
[Patent literature 3] JP 1979-006251 B
[Patent literature 4] JP 1982-055454 B
[Patent literature 5] JP 1988-258642 B
[Patent literature 6] JP 1986-227913 A
[Patent literature 7] JP 1988-270306 A
[Patent literature 8] JP 2007-230794 A
[Patent literature 9] JP 2008-285356 A

OUTLINE OF THE INVENTION

Problems to be Solved by the Invention

As was mentioned above, the patent literature 1 describes microencapsulated latent heat materials such as magnesium chloride, sodium chloride, paraffin, naphthalene and so on filled in shells made of rubbers, plastics, metals and so on as examples of microencapsulation of latent heat materials. However, as a matter of fact, almost all the conventional microencapsulated latent heat materials are those encapsulated in polymer capsules due to the necessity to prevent the latent heat material leakage from capsules (prevention of sustained release), which led to problems in mechanical strength and heat resistance.

For this reason, it has been a common concept that the recovery of waste heat of high temperature around 200° C., conventionally said to exist in large amount, and transportation of that kind of heat to a place in need of heat are difficult to achieve.

In view of such circumstances, the present invention provides microencapsulated latent heat transport materials that have high mechanical strength and high heat resistance with capability of easily recovering high temperature waste heat and transporting that heat to a place where heat is needed.

Note that, in this specification, the expression "latent heat transport material" is used to mean a latent heat material that is microencapsulated. Also, "a phase change substance" is a substance that absorbs and releases latent heat in response to a temperature change, which is synonymous with "latent heat material".

Means to Solve the Objects

In order to solve the issue mentioned above, the inventors of the present invention obtained a scientific knowledge, as a result of keen investigation on microencapsulated latent heat transport materials, that a latent heat transport material consisting of a phase change substance enclosed in hard shell microcapsules made of silica substance has excellent mechanical strength and heat resistance and is capable of recovering high temperature waste heat and the recovered heat can be easily transported to the place where heat is necessary. However, there is a problem that how a microcapsule made of silica substance is manufactured conforming to the minute size required to the latent transport material. And, there is further a problem that silica particles have tendency to intrinsically form pores of several nm diameter and it is difficult to fill a phase change substance through the pores of those sizes. For these reasons, it is not easy to realize a latent heat transport material of a phase change substance enclosed in hard shell microcapsules made of a silica material. The present inventors overcame these problems, which led to accomplishment of a latent heat transport material constituting of a phase change material enclosed in hard shell microcapsules made of a silica material.

Namely, the latent heat transport material encapsulated in the microcapsule of hard shell according to the present invention consists of non-porous hollow silica particles encapsulating a phase change material that absorbs and discharges latent heat according to a temperature change.

According to the non-porous hollow silica particles including a phase change material, mechanical strength and heat resistivity are excellent and all the phase change material (latent heat material) included can be utilized as long as the phase of the material changes at any temperature equal to or lower than 600° C. Here, the condition "equal to or lower than 600° C." is based on the consideration of the glass transition temperature of silica.

Those employing conventionally known microcapsules made of resin have difficulty in using the phase change materials with phase change temperatures equal to or higher than 80° C. Also those employing resin microcapsules lack mechanical strength and accordingly cannot be added to concrete or asphalt for example, and further cannot withstand the force applied by rolling or resin processing and cannot be added to paint, plastics and so on that require mechanical strength at their machining. The latent heat transport material microencapsulated in hard shell (the hard shell microencapsulated latent heat transport material) according to the present invention can utilize phase transition materials having a phase transition temperature in a low temperature region (near 0° C.) as long as the temperature is equal to or lower than 600° C. and application in a wide temperature range can be expected.

The phase change materials having a phase change temperature equal to or lower than 600° C. can be utilized. However, it is better to use phase transition materials having phase transition temperatures equal to or higher than 80° C. and equal to or lower than 600° C., so that waste heat can be recovered in a high temperature region.

As a phase transition material (a latent heat material) at a high temperature region, for example, lithium hydrate-sodium hydrate based molten salt and sodium hydrate-potassium hydrate based molten salt both having phase transition temperatures at around 450° C. can be preferably employed. Also, sodium hydrate-sodium nitrate based molten salt and sodium hydrate-sodium nitrate based molten salt both having the phase transition temperatures at a 220~250° C. region can also be preferably employed. In addition to the above, organic matters such as pentaerythritol, poly-ethylene, propionamid, and inorganic hydrates such as magnesium chloride and magnesium nitrate, having phase transition temperatures in the 80~200° C. region can be preferably employed depending on the heat source of the heat transport object.

The fact that phase transition materials having transition temperatures equal to or higher than 80° C. can be employed means that this is also a feature of the hard shell microencapsulated latent heat transport material of the present invention. This can be said because those using the conventionally known resin microcapsules have difficulty in using phase change materials having the phase transition temperatures at equal to or higher than 80° C. For those using resin microcapsules, there is no other choice but to use phase change materials having phase transition temperatures equal to or lower than 80° C. considering the melting point of the resin.

Here, in the hard shell microencapsulated latent heat transport materials mentioned above in this invention, the non-porous hollow silica particles is characterized by coating of the outer shell of the porous hollow silica particles by silica.

The porous hollow silica particles are immersed into the molten salt of a phase change material that changes the phase from solid to liquid by melting at a desired selected temperature (the phase change temperature), to have the phase change material included in the porous hollow silica particles using the physical means such as ultrasonic and shock waves. And the outer shell of the porous hollow silica particle is coated by silica. In this manner, the non-porous hollow silica particle including the phase change material, namely a hard shell microencapsulated latent heat transport material is manufactured.

And, regarding the hard shell microencapsulated latent heat transport material according to the present invention, said phase change material inside the non-porous hollow silica particle does not include a super cooling prevention agent and has a super cooling degree smaller than that of the phase change material. Namely, the hard shell microencapsulated latent heat transport material is characterized to have lower super cooling degree than that of the phase change material not encapsulated. Here, the super cooling degree of the phase change material is represented by the difference of two temperatures, the first one being the temperature whereat coagulation of the phase change material starts, which is somewhat lower than the second temperature being the melting temperature of the molten liquid.

For the hard shell encapsulated latent heat transport material according to the present invention, the pore diameter of the porous hollow silica particle is 10 nm~200 μm and the particle diameter is 1 μm~4 mm, preferably. The reason for the pore diameter of the porous hollow silica particle being preferably 10 nm~200 μm is that it becomes difficult to have the phase change material included in the porous hollow silica particle even when the porous hollow silica particles are immersed in a molten liquid of the phase change material and physical means such as ultrasonic waves and shock waves is employed, when the pore diameter is smaller than 10 nm. Also, when the pore diameter is larger than 200 μm, synthesis of porous hollow silica particles having such pores is difficult and it becomes difficult to coat the outer shell with silica because the pore portion can be fractured.

Note that the pore diameter of the porous hollow silica particle is determined according to the particle diameter size. The pore diameter, when it is large, brings good effects to inclusion (substitution of contents) of the phase change material. However, the possibility of the phase change material to be flown out in the washing process of the particle becomes higher if the pore diameter is too large.

Also, the reason for the particle diameter of the porous hollow silica particle to be preferably 1 μm~4 mm is that the handling of the particle in the manufacturing process is difficult when the particle diameter is smaller than 1 μm, and also the pore size becomes smaller than 10 nm when the ratio of the pore diameter and the particle diameter is made to be 1:100. Also, when the particle size is larger than 4 mm, it is not desirable because the risk of pipe blocking in the piping system for heat transport is heightened. Note that the ratio between the pore diameter of the porous hollow silica particle and the particle diameter is made to be mostly 1:20~1:100, however the ratio is not limited to this scope. As has been mentioned above, the pore diameter of the porous hollow silica particle is determined according to the size of the particle diameter, and the particle diameter must not be too small or too large.

Next, the manufacturing method of the hard shell microencapsulated latent heat transport material according to the present invention is explained.

The manufacturing method of the hard shell microencapsulated latent heat transport material according to the present invention consists of the following 1)~3) steps.

1) A step for manufacturing porous hollow silica particles.

2) A step for adding porous hollow silica particles in the melting liquid of the phase change material and enclosing the phase change material in the porous hollow silica particle.

3) A step for covering the outer shell of said porous hollow silica particle with silica.

In the step of manufacturing porous hollow silica particle described in 1) above, the porous hollow silica particles can be manufactured using the known manufacturing method, for example the emulsion method and so on wherein aggregate of water-soluble polymer particles is made and then the polymer is burned.

Here, the hole diameter of the porous hollow silica particles is 10 nm~200 μm and the particle diameter is 1 μm~4 mm.

In the case where the pore diameter of the porous hollow silica particle is smaller than 10 nm, it becomes difficult to have the phase change material included in the porous hollow silica particles even if the physical means such as supersonic waves and shock waves are employed, and in the case where the pore diameter is larger than 200 μm, the synthesis of the porous hollow silica particle is difficult and it also becomes difficult to coat the outer shell with silica because the pore portion can be fractured. Also, in the case where the particle diameter is smaller than 1 μm, the handling during production process becomes difficult and the pore diameter of the surface tends to become smaller and in the case where the particle size is larger than 4 mm, the risk of pipe blocking in the piping system for heat transport is heightened.

In the step for adding porous hollow silica particles into the fusion liquid of the phase change material and enclosing the phase change material in the porous hollow silica particle in 2) above, the porous hollow silica particles are added in the melting liquid of the phase change material and this mixture is stirred and then the operation of violently shaking the porous hollow silica particles is repeated using, for example, ultrasonic irradiation or a vortex mixer (an instrument for mixing liquid content by high speed revolving of the test tube bottom), that is to say by repeating shaking steps, in order to enclose the phase change material in the porous hollow silica particles.

Or the so called evacuating which immerses the porous hollow silica particles into melting liquid of the phase change material and then decompresses is acceptable.

Also, when the step for covering the outer shell of said porous hollow silica particle with silica as in 3) above is specifically described, polysilazane having all the side chains being hydrogen is added to porous hollow silica particles and the resulting material system is calcined.

The compound having the Si—N(silicon-nitrogen) bond is called silazane. Polysilazane is an inorganic polymer soluble in organic solvent having —(SiH$_2$NH)— as a basic unit and polysilazane with all side chains thereof being hydrogen is called perhydro-polysilazane (PHPS). A solution of perhydro-polysilazane (PHPS) in organic solvent is used as a coating liquid and the coated layer is calcined to react with water and oxygen, and finally fine and high purity silica (amorphous SiO$_2$) layer can be manufactured. The outer shell of the porous hollow silica is covered by silica exploiting the characteristics of perhydro-polysilazane (PHPS).

Or, the step to cover the outer shell of the porous hollow silica particle with silica in 3) above can also be accomplished by dropping sodium silicate solution on the porous hollow silica particles with a phase change material enclosed and subsequently dropping ammonium carbonate solution and then drying the resulting material.

Also, in the manufacturing method of the hard shell microencapsulated latent heat transport material according to the present invention, the following is a preferable sequence, namely, after the step of enclosing the phase change material within the porous hollow silica particle mentioned in 2) above, a step wherein the porous hollow silica particle having the phase change material enclosed therein is washed with saturated aqueous solution of the phase change material is further furnished before the step of covering the outer shell of the porous hollow silica particles with silica as in 3) described above.

In the step for washing the porous hollow silica particles having an enclosed phase change material with saturated aqueous solution of the phase change material, a mixture of melting liquid of the phase change material and the porous hollow silica particles is centrifuged and washed with a quasi-saturated aqueous solution after removing the supernatant, for example. By washing with quasi-saturated aqueous solution of the phase change material, the phase change material included in the porous hollow silica particles can be restrained from being released from the pore of the porous hollow silica particles.

The washing step is a step to eliminate the excess from the surface of the porous hollow silica particle and other means, for example, such as a method to eliminate the excess at the surface by friction caused by vibration can be employed.

The hard shell microencapsulated latent heat transport material described above or the solid consisting of materials mixed or intermingled with the hard shell microencapsulated latent heat transport material manufactured by the manufacturing method according to the present invention can mitigate the temperature up and down and can be applied to various purposes, accordingly. The hard shell microencapsulated latent heat transport material is of the same quality as sand and the temperature up and down of buildings and roads can be mitigated by mixing into asphalt and concrete, which becomes one solution of problems arising from expansion/contraction.

Also, mixing of the hard shell microencapsulated latent heat transport material into paint, fiber for clothe, resin and so on can relax the temperature up and down of such materials.

Also, the hard shell microencapsulated latent heat transport material according to the present invention described above or the thermally conductive fluid formed by containing the hard shell microencapsulated latent heat transport material manufactured by the manufacturing method according to the present invention and the carrier fluid can be preferably put to use as a heat medium which flows in the piping system of a heat transport device which recovers waste heat of 200° C. conventionally said to exist in a great quantity and transports it to the place in need of heat.

Effects of the Invention

According to the hard shell microencapsulated latent heat transport material of the present invention, inclusion of a latent heat material excellent in mechanical strength and heat resistivity and capable of changing its own phase at any temperature equal to or lower than 600° C. is possible. Therefore, there is no need to be concerned about crash of transport pumps and so on when heat transport is conducted and this heat transport system can be applied to chemical processes because it is chemically stable and superior in corrosion resistance. Therefore, the hard shell microencapsulated heat transfer material in this invention can be easily incorporated into asphalt, concrete, paint, clothes and resin.

Also, according to the hard shell microencapsulated latent heat transfer material of this invention, waste heat at 200° C. which is conventionally said to exist in large amount is recovered and the recovered heat is easily transported to a place in need of heat. Because the material has the same quality as sand, it is possible to relax the temperature up and down by mixing into asphalt and concrete.

Furthermore, in the case of the hard shell microencapsulated latent heat transfer material of the present invention, due to the fact that the surface is coated with silica, there are such effects as suppression of flocculation and closing that have been regarded as the problems of the conventional latent heat transport.

BEST MODE FOR CARRYING OUT THE INVENTION

Hereinafter, embodiments of the present invention will be described in detail below with reference to the drawings. The present invention is not limited to the following embodiment and examples of shown in the figure, and the present invention can be variously changed in design.

Embodiment 1

One embodiment of the manufacturing method of the hard shell microencapsulated latent heat transfer material according to the present invention is explained.

In embodiment 1, disodium hydrogen-phosphate is used as the phase change material. And preparation of the porous hollow silica particle is performed by the following sequence wherein water soluble sodium silicate and poly methyl methacrylate which is a water soluble compound for pore formation are mixed and the mixture is dispersed in an oil phase to be used for synthesis by interfacial reaction employing the W/O/W emulsion method.

Disodium hydrogen-phosphate used as the phase change material is obtained by neutralization reaction of phosphoric acid and sodium salts (sodium hydroxides, sodium carbonates and so on) establishing bondages between 1 phosphoric acid and 2 sodium. There are two kinds of sodium phosphates, the first one is disodium hydrogen-phosphate (crystal) having water of crystallization and the second one is an anhydride of disodium hydrogen-phosphate (anhydride). Here, disodium hydrogen-phosphate (anhydride) is employed.

Figure 1:
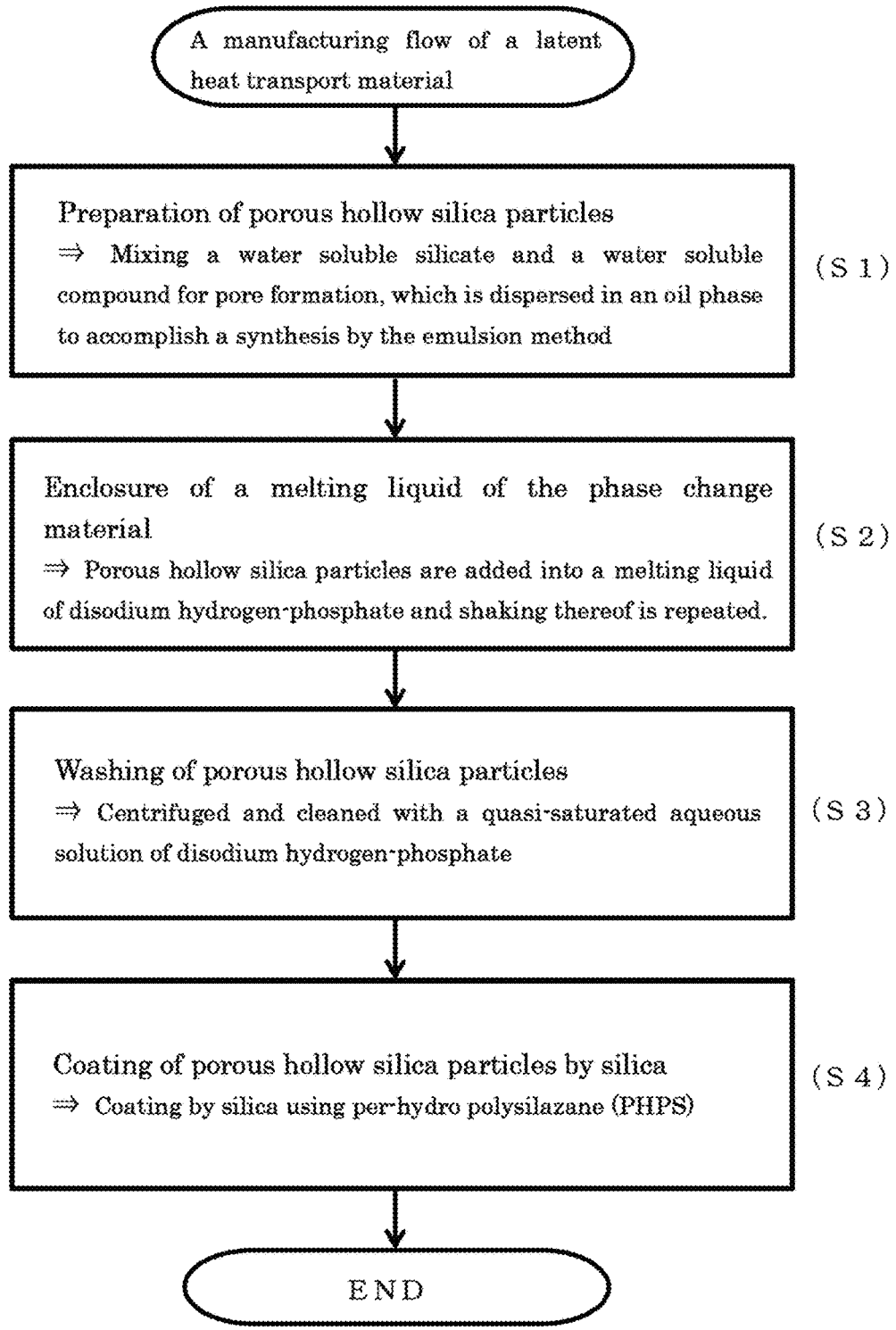
FIG. 1 A manufacturing flow of the hard shell microencapsulated latent heat transport material of embodiment 1
Figure 2:
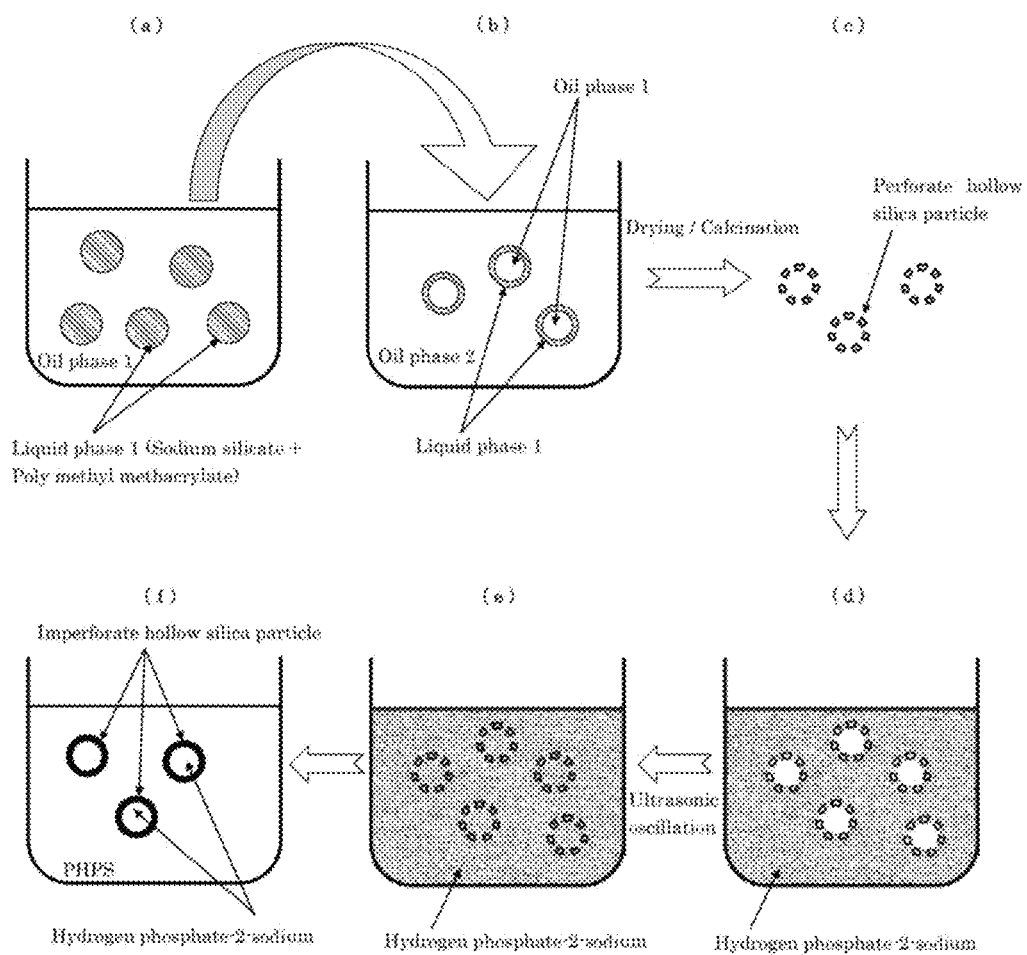
FIG. 2 A schematic chart of the hard shell microencapsulated latent heat transport material synthesis of embodiment 1

The manufacturing method of the hard shell microencapsulated latent heat transport material according to embodiment 1 consists of the following 1)~4) steps and each step out of the 4 steps is described below in detail. FIG. 1 shows a manufacturing flow of the hard shell microencapsulated latent heat transport material according to embodiment 1. And FIG. 2 shows a schematic chart of the hard shell microencapsulated latent heat transport material synthesis.

1) Preparation of Porous Hollow Silica Particles (S1)

Water soluble sodium silicate and poly methyl methacrylate which is a water soluble compound for pore formation are mixed and the mixture is dispersed in an oil phase to be used for synthesis by interfacial reaction employing the W/O/W emulsion method.

2) Enclosure of a Melting Liquid of the Phase Change Material (S2)

By adding porous hollow silica particles to a melting liquid of disodium hydrogen-phosphate which is a phase transition material and subsequently repeating shaking, disodium hydrogen-phosphate is enclosed in the porous hollow silica particles.

3) Washing of Porous Hollow Silica Particles (S3)

Porous hollow silica particles enclosing disodium hydrogen-phosphate are centrifuged and washed by quasi saturated aqueous solution of disodium hydrogen-phosphate.

4) Coating of Porous Hollow Silica Particles by Silica (S4)

Coat the outer shell of the washed porous hollow silica particles after washing, with silica using perhydropolysilazane (PHPS)

<Preparation of Porous Hollow Silica Particles>

Water phase 1, oil phase 1 and water phase 2 at the W/O/W emulsion method are explained.

(a) Water Phase 1

30 gram of 30% concentration sodium silicate aqueous solution and 10 gram of methyl poly methacrylate (molecular weight ~9500) aqueous solution and the volume thereof is adjusted to become 36 ml by adding water.

(b) Oil Phase 1

72 ml of n-hexane, 1 g of surfactant Tween 80 (Polyoxyethylene Sorbitan Monooleate) and 0.5 g of Span 80 (Sorbitan Monoleate) are mixed. (Teen and Span are trademarks)

(C) Water Phase 2

250 ml (2 mol/l) of ammonium hydrogen carbonate is prepared. (About 39.8 g of ammonium hydrogen carbonate is poured and adjusted to become 250 ml by adding water)

At first, water phase 1 and oil phase 1 are mixed for 1 minute at 8200 rpm using a mixing type homogenizer (refer to FIG. 2 (*a*)). And the mixture and the water phase 2 are mixed and stirred using a magnetic stirrer for 2 hours at 35° C. (refer to FIG. 2 (*b*))

Next, the mixture is washed 3 times by water and 1 time by ethanol, and is dried at 100° C. for 12 hours and after that, the mixture is calcined by a condition that 700° C. is reached within 60 minutes.

By the process mentioned above, the porous hollow silica particles are prepared. (Refer to FIG. 2 (*c*))

By the preparation method described above, the volume ratio for three phases are set as follows; water phase 1:oil phase 1:water phase 2=1:1:7. The volume ratio is not limited to the above and can be adjusted, accordingly. For example, a solution of a ratio 1:8:7 wherein oil ratio is different from the above can prepare the porous hollow silica particles without any problems.

Figure 3:
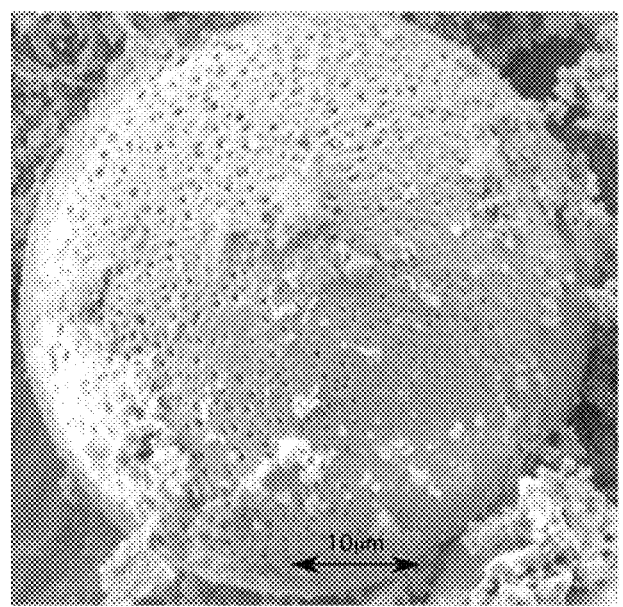
FIG. 3 A scanning electron microscope image of porous hollow silica particles FIG. 4 A scanning electron microscope of the non-porous hollow silica particles FIG. 5 A manufacturing flow of the hard shell microencapsulated latent heat transport material of embodiment 2

FIG. 3 shows one example of a scanning electron microscope image of prepared porous hollow silica particles. The porous hollow silica particles shown in FIG. 3 have diameters of about 50 μm, having innumerable pores. Also, the pore diameter is about 0.5 μm.

<2. Enclosure of a Melting Liquid of a Phase Change Material>

An appropriate volume of disodium hydrogen-phosphate which is a phase change material is poured into a beaker and the disodium hydrogen-phosphate is melted at 50~65° C.

And, the porous hollow silica particles prepared were poured into melting liquid of disodium hydrogen-phosphate, which is stirred by a magnetic stirrer. (Refer to FIG. 2 (*d*)) Under a condition wherein the temperature of the melting liquid of disodium hydrogen-phosphate is kept as accurately as possible, the melting liquid of disodium hydrogen-phosphate is enclosed in the porous hollow silica particles by repeated mechanical shocks using ultrasonic radiation or a vortex mixer. (Refer to FIG. 2 (*e*))

<3. Washing of Porous Hollow Silica Particles>

A mixture of the disodium hydrogen-phosphate melting liquid and the porous hollow silica particles is centrifuged. Then, the porous hollow silica particles are washed by using quasi saturated aqueous solution of disodium hydrogen-phosphate after eliminating the supernatant. The purpose of this procedure is to eliminate the excess disodium hydrogen-phosphate outside of the capsule.

<4. Coating of Porous Hollow Silica Particles by Silica>

After washing the porous hollow silica particles with quasi saturated aqueous solution of disodium hydrogen-phosphate, the supernatant is eliminated. After adding perhydropolysilazane (PHPS) to the porous hollow silica particles after eliminating the supernatant, the porous hollow silica particles are calcined for 3~4 hours at 200° C. (Refer to FIG. 2 (*f*)) By this procedure, the outer shell of the porous hollow silica particles can be covered by silica and the hard shell microencapsulated latent heat transport material consisting of non-porous hollow silica particles including disodium hydrogen-phosphate which is a phase transition material can be obtained.

Figure 4:
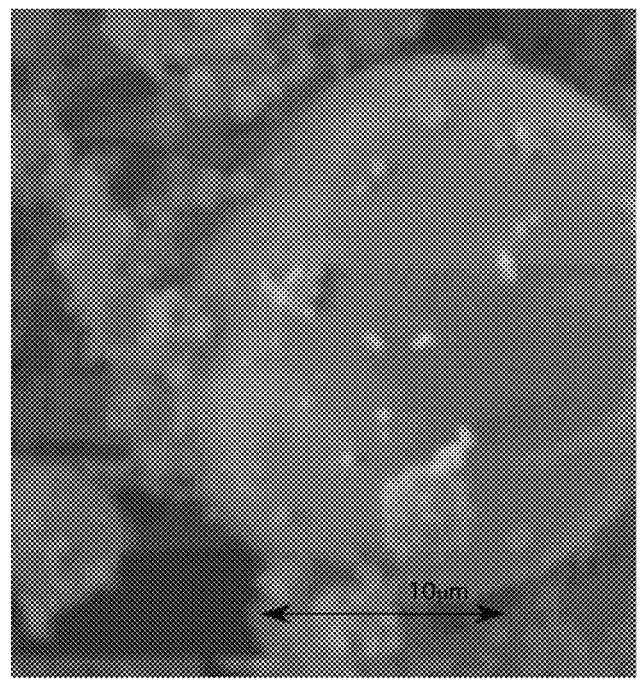

FIG. 4 shows one image example of scanning electron microscope of the non-porous hollow silica particles thus obtained. In the image shown in FIG. 4, pores cannot be observed at the outer shell surface of the silica particles and it is known that the outer shell is completely covered by silica.

The silica particles shown in FIG. 4 includes disodium hydrogen-phosphate (the phase change material) and functions as a hard shell microencapsulated latent heat transfer material. Perfect coverage of the outer shell by silica improves the mechanical strength and heat resistivity of the capsule. The silica particles described here are not crushed by a transport pump or so on when latent heat transport is performed and are chemically stable and superiorly corrosion resistant.

Embodiment 2

In embodiment 2, by another method different from the method according to embodiment 1, the preparation method of the hard shell microencapsulated latent heat transport material including trimethylolethane (TME) is explained.

The TME hydrate has its phase transition temperature at about 15° C. and the phase transition temperature can be adjusted by controlling its concentration. The TME hydrate has a latent heat of 218 (kJ/kg) and its use as a cooling medium of air conditioning systems is expected.

The encapsulation sequence of trimethylolethane (TME) into the hard shell microcapsule is explained below.

Figure 5:
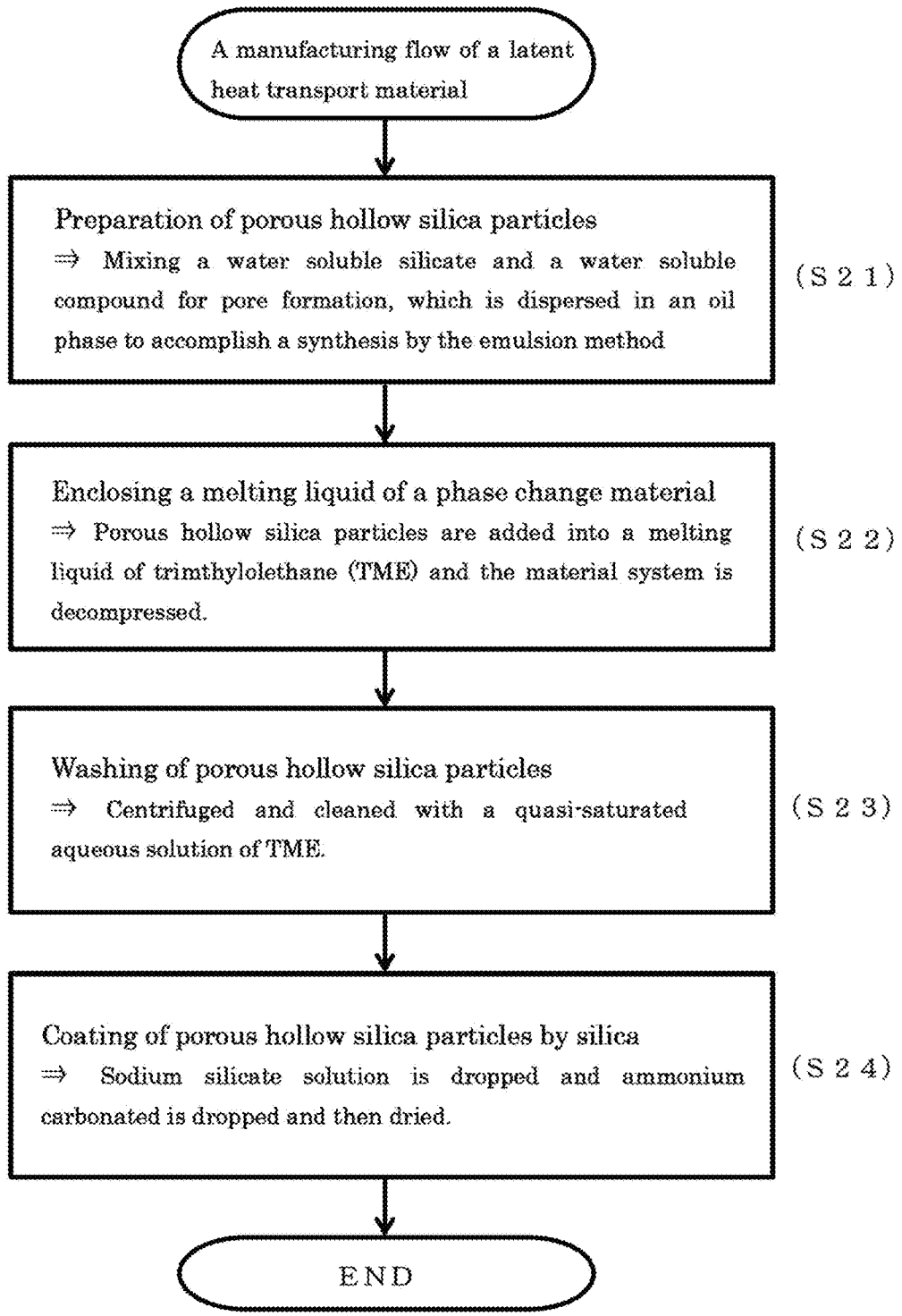

The manufacturing method of the hard shell microencapsulated latent heat transport material according to embodiment 2 consists of the following a)~d) steps with the flow shown in FIG. 5.

a) Preparation of Porous Hollow Silica Particles (S21)

Water soluble sodium silicate and poly methyl methacrylate which is a water soluble compound for pore formation are mixed and the mixture is dispersed in an oil phase to be used for synthesis by interfacial reaction employing the W/O/W emulsion method.

b) Enclosure of Melting Liquid of the Phase Change Material (S22)

Porous hollow silica particles are poured into the melting liquid of trimethylolethane (TME) which is a phase change material and trimethylolethane (TME) is enclosed in the porous hollow silica particles by decompression.

c) Washing of Porous Hollow Silica Particles (S23)

Porous hollow silica particles having trimethylolethane (TME) enclosed are centrifuged and washed with quasi saturated aqueous solution of trimethylolethane (TME).

d) Coating of Porous Hollow Silica Particles by Silica (S24)

Sodium silicate solution is dropped on the outer shell of the washed porous hollow silica particles and, after that, ammonium carbonate solution is dropped and the porous hollow silica particles are dried to have the outer shell coated with silica.

Below, b)~d) mentioned above are explained in detail. Note that a) above is similar to the one explained in embodiment 1 and the explanation is omitted here.

First of all, microcapsules are immersed in TME 25 weight percent aqueous solution inside a test tube. Next, the test tube is decompressed with a 5 (KPa) vacuum pump for 1 hour in order to eliminate air from the inside of the microcapsules. After that, the microcapsules filled with TME are centrifuged to be separated from the residual TME solution. After the separation, the microcapsules are cooled and dried for 1 day.

Next, for covering the pores of microcapsule, 2 mL of sodium silicate solution (10 g, 30% of $SiO_2$ in 12 mL of water) is dropped on 0.3 g of microcapsules dried under stirring. Furthermore, 2 mL of ammonium carbonate solution (2 mol/L) is dropped on the microcapsules. And, after stirring for 2 hours at 35° C., the microcapsules containing TME hydrate are dried for 1 day at a room temperature.

By the process described above, the pores of microcapsules containing TME hydrate are completely closed. Note that the median diameter of microcapsules containing TME hydrate was 19.0 μm.

Embodiment 3

Figure 6:
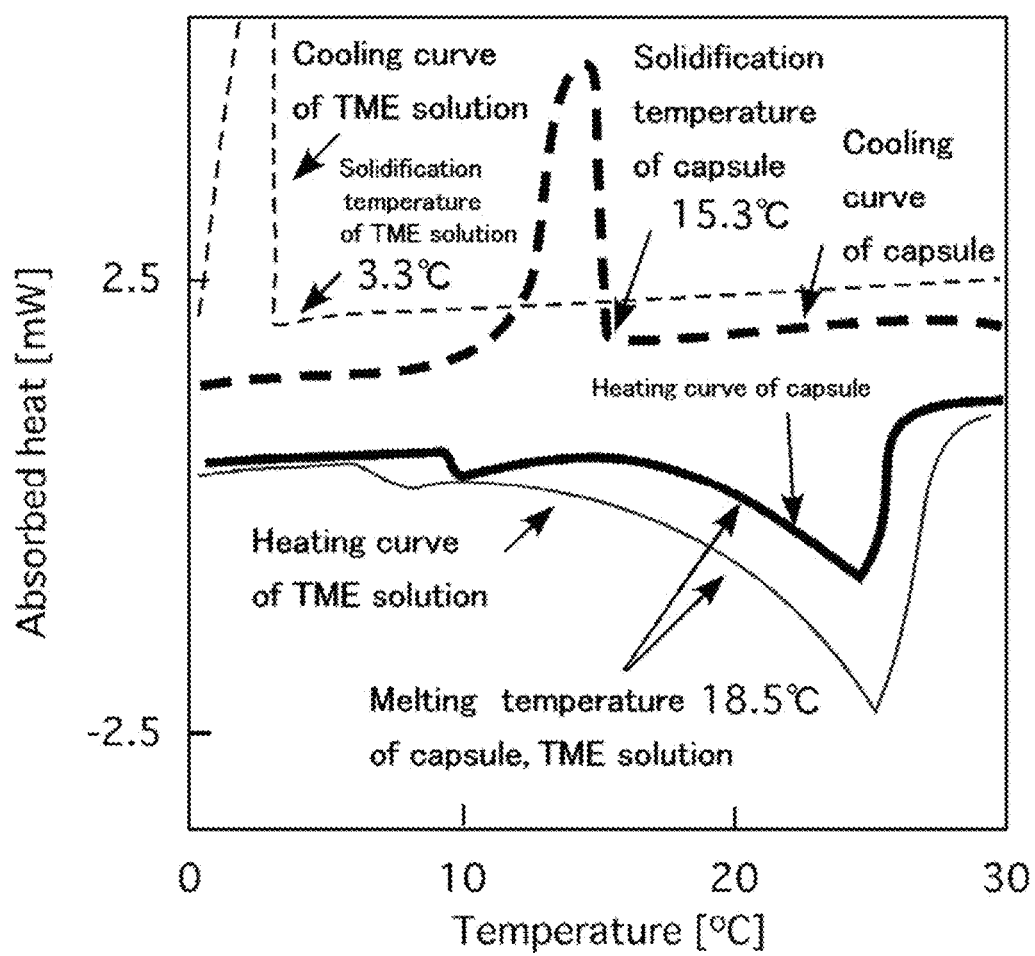
FIG. 6 A DSC curve of the hard shell microencapsulated latent heat transport material of embodiment 2

FIG. 6 shows a DSC curve (differential scanning calorimeter) of the hard shell microencapsulated latent heat transport material (TME inclusion hard shell microcapsule) including trimethylolethane (TME) and the endothermic peak of a trimethylolethane (TME) solution of 25 weight percent. The latent heat of the TME solution measured here was about 90.4 (J/kg) and the phase change temperature of the same was 16.8° C. The theoretical latent heat value of the TME 25 weight percent solution is 87.2 (kJ/kg) and this value was in good agreement with the measured value.

Also, for the two heating cycles, the measured latent heats of the hard shell microcapsules including TME were 38.8 (kJ/kg) and 48.6 (kJ/kg), respectively and the corresponding phase change temperatures were 14.8° C. and 18.5° C., respectively. Also, supercooling (a phenomenon wherein a phase does not change at the phase change temperature) is observed and the measured phase change temperatures were 15.3° C. and 15.5° C. Note that, in the graph of FIG. 6, the phase change temperature during a heating cycle is shown to be 18.5° C. and the phase change temperature during a cooling cycle is shown to be 15.3° C.

From the temperature rise curve and the temperature going down curve, it is understood that the phase change temperature of the TME inclusion hard shell microcapsules is similar to the phase change temperature of the 25 weight % TME solution. However note that, in the temperature going down curve, the coagulation temperature of the hard shell microencapsulated TME is 15.3° C. and the coagulation temperature of the TME solution is 3.3° C. From this result, it is understood that the hard shell microcapsule including TME has smaller degree of super cooling than the TME solution.

Also, the mass ratio of the TME hydrate in the microcapsule to the whole mass of the hard shell microcapsule including TME was about 54.4 wt. % calculated from the particle diameter. 54.4 wt. % of 87.2 (kJ/kg) (the latent heat of TME solution at 25 wt. %) is 47.4 (kJ/kg) and this represents the measured latent heat as mentioned above, namely 48.6 (kJ/kg). The above mentioned 48.6 (kJ/kg) well corresponds to the value 47.4 (kJ/kg) calculated from the mass ratio.

Therefore, the hard shell microcapsule including TME prepared has been confirmed to include TME hydrate. Also, it can be said that the endothermic and the exothermic peaks show enough inclusion of TME hydrate inside the microcapsule, with TME hydrate inside the microcapsule being not vaporized.

The Other Embodiment

In the embodiment 1 mentioned above, disodium hydrogen-phosphate was employed as a phase change material. However, by the non-porous hollow silica particles, various phase change materials that change their phases at any temperature below 600° C. can be utilized as the phase change material, being superior in mechanical strength and heat resistivity. For example, as the phase change materials having high phase transition temperature (80~500° C.), the materials listed in the table 1 below can be applied. The other phase change materials having the transition temperature below 600° C. can also be utilized.

TABLE 1

| Material | Phase transition temperature (° C.) |
|---|---|
| Molten salt | |
| LiOH—NaOH (30:70) | 458 |
| NaOH—KOH (50:50) | 444 |
| Organic matter | |
| Pentaerythritol | 188 |
| Poly-ethylene | 120-140 |
| Sorbitol | 95 |
| Xylitol | 92 |
| Propionamid | 81.3 |
| Inorganic hydrate | |
| $MgCl*6H_2O$ | 116-118 |
| $Al_2(SO_4)_3*10H_2O$ | 112 |
| $NH_4Al(SO_4)_2*12H_2O$ | 93.5 |
| $KAl(SO_4)_2*12H_2O$ | 92.5 |
| $Mg(NO_3)_2*6H_2O$ | 89 |
| $Sr(OH_2)*8H_2O$ | 88 |

INDUSTRIAL APPLICATION POSSIBILITY

This invention is useful as a heat medium of a heat transport device that recovers high temperature heat waste and transport the same to the place where heat is necessary.

The invention claimed is:

1. A hard shell microencapsulated latent heat transport material, comprising: non-porous hollow silica particles comprising porous hollow silica particles having outer shells covered by silica, the non-porous hollow silica particles having a phase change material included therein for causing absorption or discharge of latent heat in response to a temperature change.

2. A hard shell microencapsulated latent heat transport material according to claim 1, wherein further comprising:
    said phase change material having a phase change temperature at equal to or higher than 80° C. and equal to or lower than 600° C.

3. A hard shell microencapsulated latent heat transfer material according to claim 1, wherein further comprising:

said phase change material in said non-porous hollow silica particle, not containing super cooling prevention agent and having smaller super cooling degree than the super cooling degree of said phase change material.

4. A hard shell microencapsulated latent heat transfer material according to claim 1, wherein further comprising:
said porous hollow silica particle having a pore diameter of 10 nm~200 μm and having a particle diameter of 1 μm~4 mm.

5. A solid having ability to relax a temperature up and down movement, consisting of a material being a mixture or a mixed article of a hard shell microencapsulated latent heat transport material according to claim 1.

6. A thermally conductive fluid including a hard shell microencapsulated latent heat transport material according to claim 1, and a carrier fluid.

* * * * *